United States Patent [19]
Wheatley

[11] Patent Number: 5,873,688
[45] Date of Patent: Feb. 23, 1999

[54] CARGO BOX SIDE RAIL

[76] Inventor: Donald E. Wheatley, 1119 Wright St., Ann Arbor, Mich. 48105

[21] Appl. No.: 924,971

[22] Filed: Sep. 8, 1997

[51] Int. Cl.⁶ ...................................................... B60P 7/08
[52] U.S. Cl. ........................... 410/106; 410/101; 410/110
[58] Field of Search ..................................... 410/101, 106, 410/110, 108, 115; 248/499, 231.41, 231.61; 296/41, 100.17, 100.18

[56] References Cited

U.S. PATENT DOCUMENTS

| | | | |
|---|---|---|---|
| 4,650,382 | 3/1987 | Johnson | 410/110 |
| 4,936,724 | 6/1990 | Dutton | 410/110 |
| 5,261,719 | 11/1993 | Tucker | 296/100.18 |
| 5,301,913 | 4/1994 | Wheatley . | |
| 5,310,238 | 5/1994 | Wheatley . | |
| 5,472,256 | 12/1995 | Tucker | 296/100.18 |
| 5,476,349 | 12/1995 | Okland | 410/106 |
| 5,642,971 | 7/1997 | Ragsdale | 410/106 |
| 5,655,808 | 8/1997 | Wheatley . | |

*Primary Examiner*—Stephen T. Gordon
*Attorney, Agent, or Firm*—Harness, Dickey & Pierce, P.L.C.

[57] ABSTRACT

A cargo box side rail for a pickup truck cargo box is disclosed in which the side rail is formed with integral clamp portions to attach the side rail to the cargo box by clamping to the upper end of the cargo box. By clamping the side rail to the cargo box the use of the cargo box stake pockets is avoided. By integrally forming the side rail with a clamp portion, the number of required components for attaching the side rails is reduced simplifying the construction of the side rail.

12 Claims, 2 Drawing Sheets

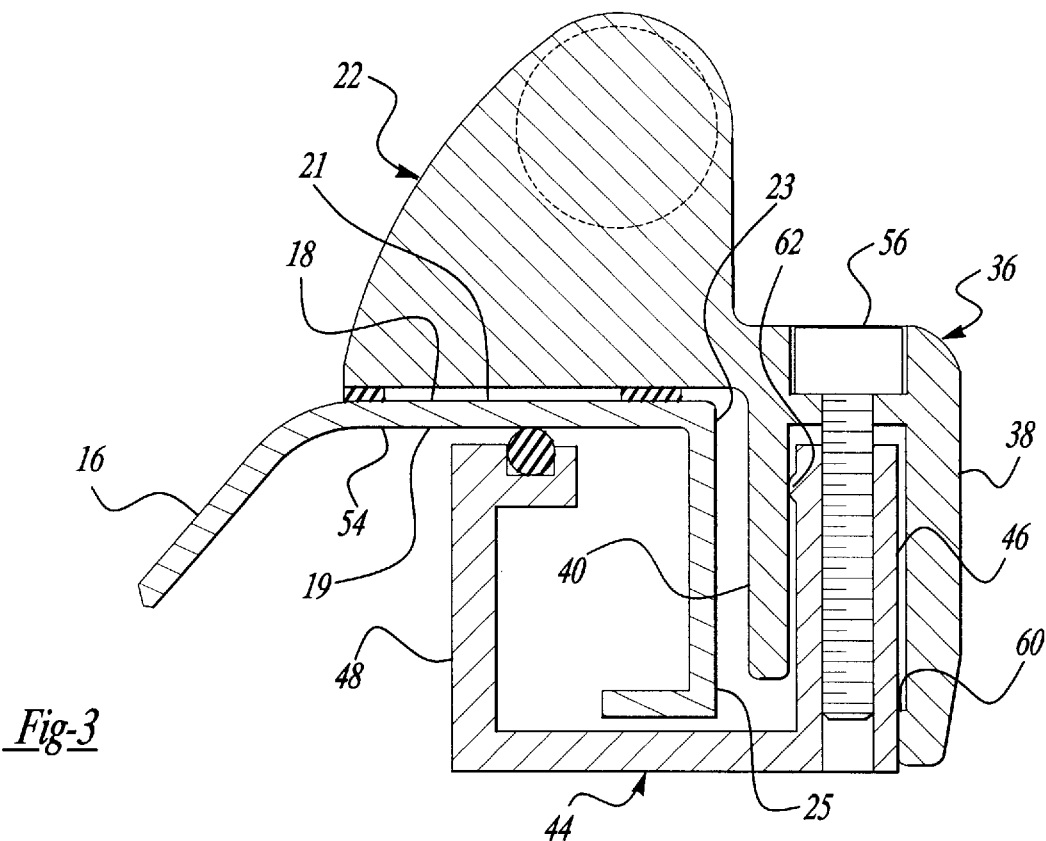
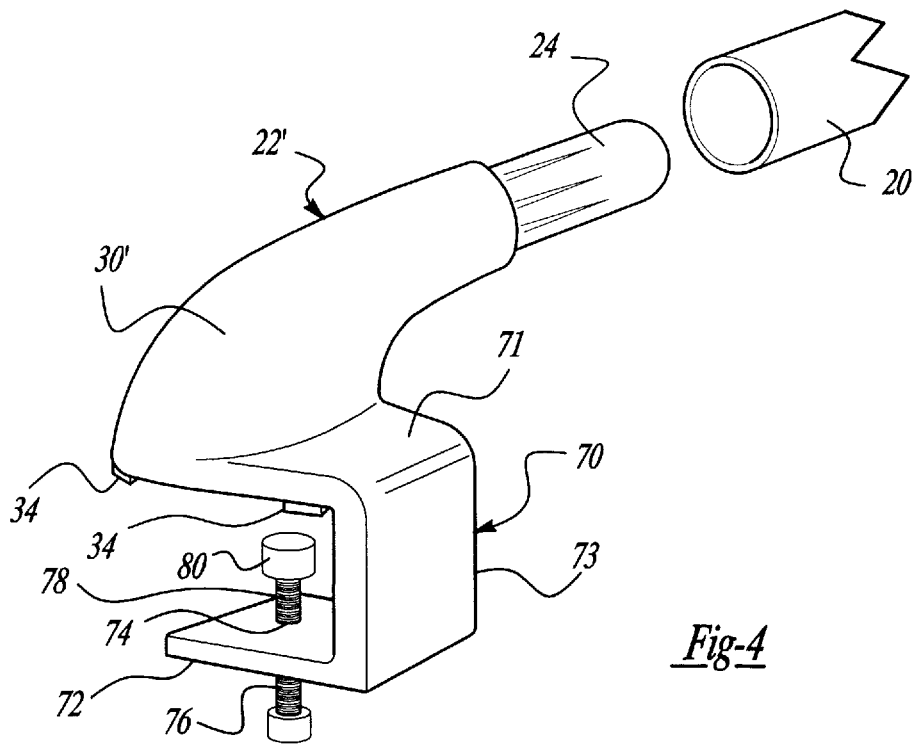

5,873,688

CARGO BOX SIDE RAIL

BACKGROUND AND SUMMARY OF THE INVENTION

The present invention relates to side rail for attachment to the upper end of a pickup truck cargo box side wall and in particular to a side rail that is integrally formed with a clamp portion for attaching the side rail and which does not utilize the cargo box stake pockets.

Side rails have commonly been attached to the side walls of pickup truck cargo boxes for decorative purposes as well as provide protection to the upper surface of the side walls. Typically, the side rails are attached to the cargo box through the stake pockets in cargo box side walls. However, the sidewall stake pockets are being used in only a small percentage of pickup trucks. As a result, there is an expectation that vehicle manufacturers may eliminate stake pockets from the cargo box.

Accordingly, it is an object of the present invention to provide a means for mounting side rails to a cargo box without utilizing the stake pocket.

It is a further feature to incorporate a clamp structure into the side rail itself rather than utilizing a separate clamp piece that cooperate with the side rail and the cargo box side wall.

It is a further feature of the present invention to provide a clamp attachment for the side rails that does not mar the cargo box by either drilling holes in the box or scratching the painted surface.

It is an advantage of the side rail of this invention that varying lengths of side rail can be used, independent of the stake pocket location. This enables the side rails to be used with a tool box mounted at the front of the cargo box. The side rails no longer have to extend along side the toolbox where they block access to the tool box.

In one embodiment of the present invention, a two-piece clamp mechanism is employed with the upper piece being integrally formed with the side rail itself. In a second embodiment, a single-piece clamp structure is used which is also integrally formed with the side rail. By clamping the side rail to the upper end of the cargo box side wall, there is no requirement for use of the stake pockets. Thus, side rails can be attached to a vehicle that does not include stake pockets in the cargo box. In addition, side rails of varying lengths can be used and attached any where along the cargo box side wall without regard to the location of stake pockets.

Further objects, features and advantages of the invention will become apparent from a consideration of the following description and the appended claims when taken in connection with the accompanying drawings.

BRIEF DESCRIPTION OF THE DRAWINGS

FIG. 3 is an elevational view of the side rail and clamp member attached to the cargo box as seen from the line 3—3 of FIG. 1; and FIG. 4 is a perspective view of the end fitting with an integral clamp portion of an alternative embodiment of the present invention.

DETAILED DESCRIPTION OF THE PREFERRED EMBODIMENT

Figure 1:
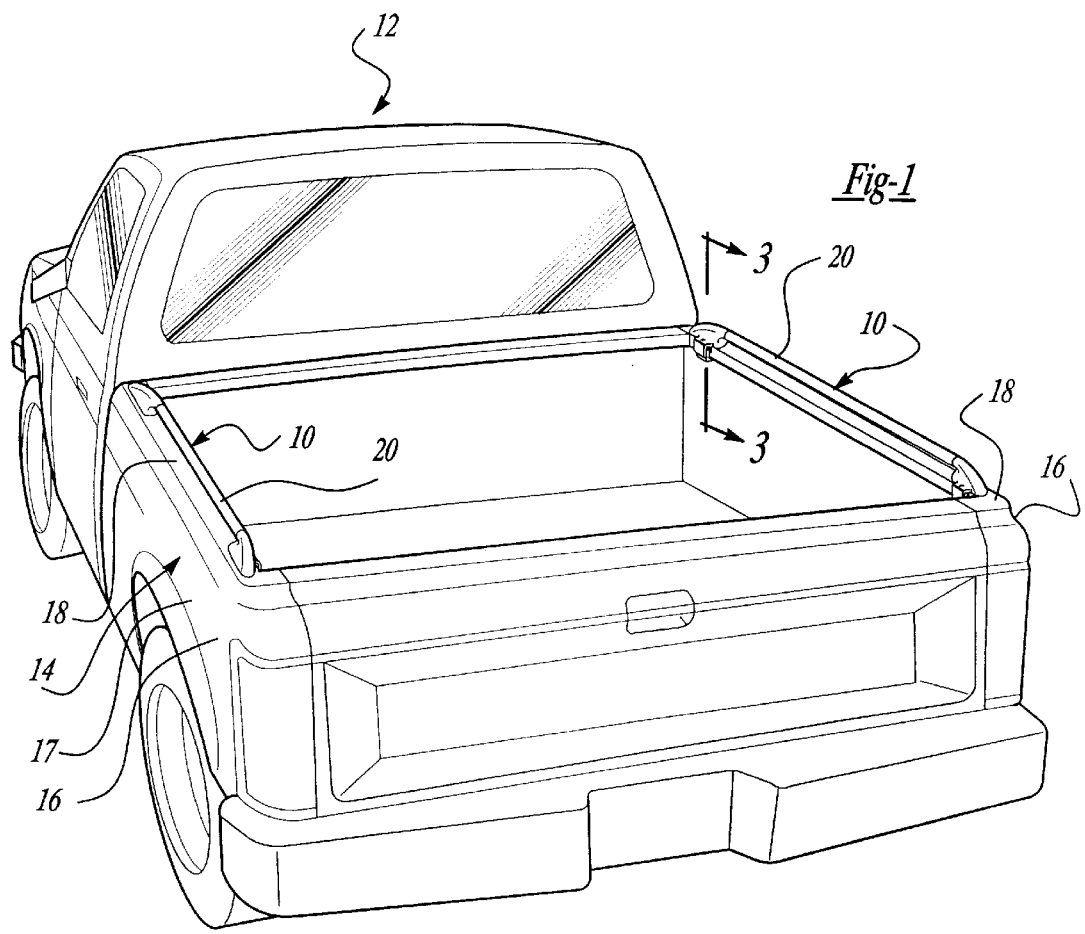
FIG. 1 is a perspective view of a pickup truck with the side rails of the present invention mounted to the cargo box side walls.

The side rails of the present invention are shown in FIG. 1 attached to a pickup truck and designated generally at 10. The side rails 10 are attached to a cargo box 14 of a pickup truck 12. The cargo box 14 has left and right sidewalls 16. The side rails 10 are attached to the side walls at the sidewall upper ends 18. The sidewall 16 has a vertical portion 17 and an upper flange 19 that extends inwardly from the vertical portion 17 forming the upper end 18. The upper flange has an upper surface 21 and a lower, or underside, surface 54. The upper flange 19 terminates at an inner edge 23 typically formed by a down turned flange 25.

Each side rail 10 comprises a rail center portion 20 which is shown as a circular tube in the figures. The rail center portion could have other cross-sectional shapes as well if desired. Front and rear end fittings 22 are attached to the front and rear ends 26 of the rail center portion 20.

Figure 2:
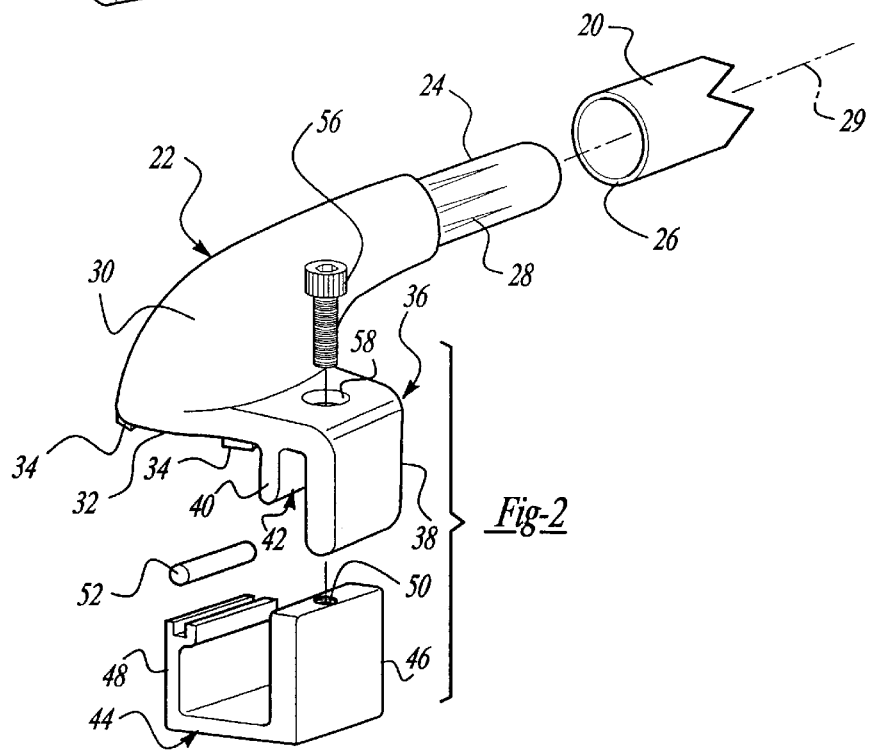
FIG. 2 is a perspective view of the side rail end fitting with an integral clamp portion and a complementary clamp member.

An end fitting 22 is shown in greater detail in FIG. 2. Each end fitting 22 has a projecting portion 24 which is sized to telescope into an end 26 of the rail center portion 20. The projecting portion 24 may include raised ribs 28 to ensure a tight engagement within the rail center portion 20 to prevent rotation of the tube once installed.

The main body portion 30 of the end fitting 22 curves downward from the axis 29 of the rail center portion 20 and projecting portion 24 to form a bottom surface 32. The bottom surface 32 rests upon the upper surface 21 of the cargo box side wall. The downward curve of the end fitting enables the rail center portion to be spaced above the upper flange of the sidewall. Rubber pads 34 are attached to the end fitting bottom surface 32 and engage the top of the cargo box side wall. The rubber pads provide protection for the cargo box surface.

Each end fitting 22 includes an integral upper clamp portion 36 which extends inward from the main body 30 beyond the side wall inner edge 23. The upper clamp portion 36 has two downward extending legs, inner leg 38 and outer leg 40. The reference to "inner" and "outer" is relative to the interior of the cargo box. Outer leg 40 is adjacent the inner edge 23 while the inner leg 38 is spaced inwardly from the outer leg. The inner and outer legs 38 and 40 form a receiving pocket 42 therebetween.

A lower clamp member 44 is generally U-shaped, having an inner leg 46 and an outer leg 48. The inner leg 46 has a threaded bore 50 extending downward into it from its upper end. The upper end of the outer leg 48 includes a rubber protective grip 52 for engagement with the underside 54 of the sidewall upper flange 19.

The end fitting 22 is clamped to the side wall by inserting the inner leg 46 of the clamp member into the receiving pocket 42 of the end fitting. A bolt 56 is inserted through the aperture 58 in the end fitting and threaded into the bore 50 of the clamp member 44. As the clamp member 44 is drawn upward against the underside of the side wall upper flange, the end fitting 22 is drawn down against the top of the side wall upper flange. This clamps the side wall upper flange between the end fitting 22 and the clamp member 44. The inner leg 38 of the end fitting has an outwardly extending rib 60 at its lower end while the inner leg 46 of the clamp member 44 has an extending rib 62 at its upper end which also faces outward. The ribs 60 and 62 maintain point contact between the clamp member and the clamp portion of the end fitting to resist the moment applied to the clamp member 44 by the clamp load acting through the clamp member outer leg 48. This avoids bending stress in the bolt 56.

An alternative embodiment is shown in FIG. 4. There the end fitting 22' has a main body 30' and a generally C-shaped clamp portion 70. Clamp portion 70 has an upper horizontal arm 71, a lower horizontal arm 72 and a connecting leg 73 therebetween at the inboard ends of the arms, forming the "C" shape. The connecting leg 73 extends downward into the cargo box, inward of the inner edge 23. The lower horizontal arm 72 of the clamp has a threaded aperture 74 therethrough. A bolt 76, or other threaded fastener, is threaded upward through the aperture 74. Once the distal end 78 of the bolt has passed through the aperture 74, a rubber end cap 80 is applied thereto. The bolt 76 is then further threaded through the aperture 74 until the rubber end cap 80 bears against the underside 54 of the sidewall upper flange.

The side rail of the present invention integrates the clamp structure into the side rail by forming the end fitting with a clamp portion. As shown in FIG. 4, the entire clamp is integrated into the end fitting. In the embodiment of FIGS. 2 and 3, a separate clamp member is fastened to the clamp portion of the end fitting.

While the side rail of the invention has been shown with separate end fittings and rail center portion, these three elements could be unitarily formed if desired, such as by a single piece, bent tube. The separate end fittings can be made by die casting but is not limited to this particular manufacturing method. The rail center portion 20 can be made by extrusion or other processes.

It is to be understood that the invention is not limited to the exact construction illustrated and described above, but that various changes and modifications may be made without departing from the spirit and scope of the invention as defined in the following claims.

I claim:

1. A side rail for a vehicle cargo box, the cargo box having an elongated side wall with an upper end forming a horizontal upper surface, the side rail comprising an elongated center portion having ends, front and rear end fittings at the front and rear ends of the center portion, the end fittings having a main body portion extending downwardly from the center portion and forming a lower generally horizontal surface for placement upon the upper surface of the side wall to support the center portion of the side rail spaced above the side wall upper surface, the end fittings further including an extending portion for insertion into the center portion to attach the end fittings to the center portion, the end fittings being integrally formed with clamp sections extending inwardly of the main body portion and downwardly below the lower generally horizontal surface formed by the main body portion for clamping the end fittings onto the side wall whereby the side rail is attached to the side wall.

2. The side rail of claim 1 wherein the clamp section of each end fitting includes inner and outer legs extending downward below the lower generally horizontal surface of the main body portion, the outer leg being adjacent an inner edge of the side wall and the inner leg being spaced inwardly therefrom forming a receiving pocket between the inner and outer leg;

a clamp member adapted to be attached to each end fitting and engage the cargo box side wall to clamp the side wall between the end fitting and the clamp member; and a fastener for attaching the clamp member to the end fitting.

3. The side rail of claim 2 wherein the clamp member is generally U-shaped having space apart legs with one clamp member leg being disposed within the receiving pocket of the end fitting clamp section and the other clamp member leg being for engagement with the cargo box side wall.

4. The side rail of claim 1 wherein the clamp section is generally C-shaped with spaced upper and lower horizontal arms and a connecting leg therebetween, the upper arm being at or above the lower generally horizontal surface, the connecting leg being inward of the main body portion of the end fitting and extending downward to the lower arm positioned below the lower generally horizontal surface of the main body portion whereby the upper end of the side can be disposed between the upper and lower arms; and further comprising a threaded fastener threaded through the lower arm for engagement with the cargo box side wall to clamp the side wall between the end fitting and the threaded fastener.

5. A side rail for a vehicle cargo box, the cargo box having an elongated side wall, the side wall having an upper end with an inwardly extending generally horizontal upper flange, the upper flange having upper and lower surfaces and terminating at an inner edge, the side rail comprising:

an elongated center portion having front and rear ends;

front and rear end portions at the front and rear ends of the center portion respectively, the end portions extending downwardly from the center portion and forming a lower generally horizontal surface for engagement with the upper surface of the side wall upper flange to support the center portion of the side rail spaced above the cargo box upper flange, the end portions further including integrally formed clamp sections extending inwardly of the center portion and downwardly below the lower generally horizontal surface for clamping the end portions onto the upper flange whereby the side rail is attached to the cargo box side wall.

6. The side rail of claim 5 wherein the clamp section of each end portion includes inner and outer legs extending downward below the lower generally horizontal surface, the outer leg being closest to the rail center portion and the inner leg being spaced inwardly from the outer leg forming a receiving pocket between the inner and outer leg; and further comprising a clamp member adapted to be attached to each end portion clamp section and engage the lower surface of the upper flange to clamp the upper flange between the end portion and the clamp member; and a fastener for attaching the clamp member to the end portion clamp section.

7. The side rail of claim 6 wherein the clamp member is generally U-shaped having space apart legs with one clamp member leg being disposed within the receiving pocket of the clamp section and the other clamp member leg being for engagement with the lower surface of the upper flange.

8. The side rail of claim 6 wherein the end portion and the clamp section are integrally formed as a single die cast component.

9. The side rail of claim 5 wherein the clamp section is generally C-shaped with spaced upper and lower horizontal arms and a connecting leg therebetween located inward of the rail center portion, the upper leg being disposed above the lower generally horizontal surface and the lower leg being disposed below the lower generally horizontal surface; and further comprising a threaded fastener threaded through the lower arm and extending upward for engagement with the lower surface of the cargo box upper flange to clamp the upper flange between the end portion and the threaded fastener.

10. The side rail of claim 9 wherein the end portion and the C-shaped clamp section are integrally formed as a single die cast component.

11. The side rail of claim 5 wherein the center portion, the front end portion and the rear end portion are separate elements coupled to one another to form the side rail.

12. The side rail of claim 11 wherein the front and rear end portions have extending sections that telescope into opposite ends of the center portion.

* * * * *